(12) United States Patent
Lee et al.

(10) Patent No.: US 8,704,151 B2
(45) Date of Patent: Apr. 22, 2014

(54) COMMUNICATION DEVICE SENSOR ASSEMBLY

(75) Inventors: Hsin Chin Lee, Kitchener (CA); Antanas Matthew Broga, Cambridge (CA)

(73) Assignee: BlackBerry Limited, Waterloo (CA)

( * ) Notice: Subject to any disclaimer, the term of this patent is extended or adjusted under 35 U.S.C. 154(b) by 659 days.

(21) Appl. No.: 12/854,400

(22) Filed: Aug. 11, 2010

(65) Prior Publication Data

US 2012/0037794 A1    Feb. 16, 2012

(51) Int. Cl.
*H01J 3/14* (2006.01)

(52) U.S. Cl.
USPC .......................................... 250/221; 345/175

(58) Field of Classification Search
USPC .................. 250/208.1, 216, 221; 348/124
See application file for complete search history.

(56) References Cited

U.S. PATENT DOCUMENTS

| 7,253,394 | B2 * | 8/2007 | Kang ............................. | 250/216 |
| 7,554,076 | B2 * | 6/2009 | Wang et al. .................... | 250/221 |
| 8,035,624 | B2 * | 10/2011 | Bell et al. ...................... | 345/175 |
| 8,204,283 | B2 * | 6/2012 | Wu ................................ | 382/124 |

FOREIGN PATENT DOCUMENTS

| DE | 4406906 A1 | 9/1995 |
| DE | 10254888 A1 | 6/2004 |
| EP | 1408343 A1 | 4/2004 |
| GB | 2346500 A | 8/2000 |
| GB | 2458832 A | 10/2009 |
| WO | 9115872 A1 | 10/1991 |

OTHER PUBLICATIONS

Apple iPhone 3 G's third sensor revealed—another proximity sensor. Retrieved Jun. 13, 2008.
Extended European Search Report mailed May 26, 2011. In corresponding application No. 10172570.3.
Partial European Search Report mailed Feb. 1, 2011. In corresponding application No. 10172570.3.
How Infrared motion detector components work. http://www.glolab.com/pirparts/infrared.html.Updated Jan. 2012.
Agilent's new proximity sensor beats the fumble-fingered competition hands down . . . Literally. Retrieved Sep. 1, 2004.

* cited by examiner

*Primary Examiner* — Tony Ko
(74) *Attorney, Agent, or Firm* — Novak Druce Connolly Bove + Quigg LLP

(57) ABSTRACT

A proximity sensor assembly including a light source, a first detector, and a first light focusing device. The light source is operative to emit light toward a first target area. The first detector is operative to detect light, including light emitted by the light source and reflected from the first target area. The first light focusing device is in a first optical path between the light source and the first detector. The first optical path includes an optical path from the light source and reflected from the first target area.

18 Claims, 25 Drawing Sheets

COMMUNICATION DEVICE SENSOR ASSEMBLY

FIELD OF THE TECHNOLOGY

The present disclosure relates generally to sensor assemblies for electronic communication devices, and to electronic communication devices containing such assemblies. More specifically, enabling implementations relate to one or more sensor modules behind a microprism lens, and the use of such modules in combination to manage device power consumption in electronic communication devices.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1:
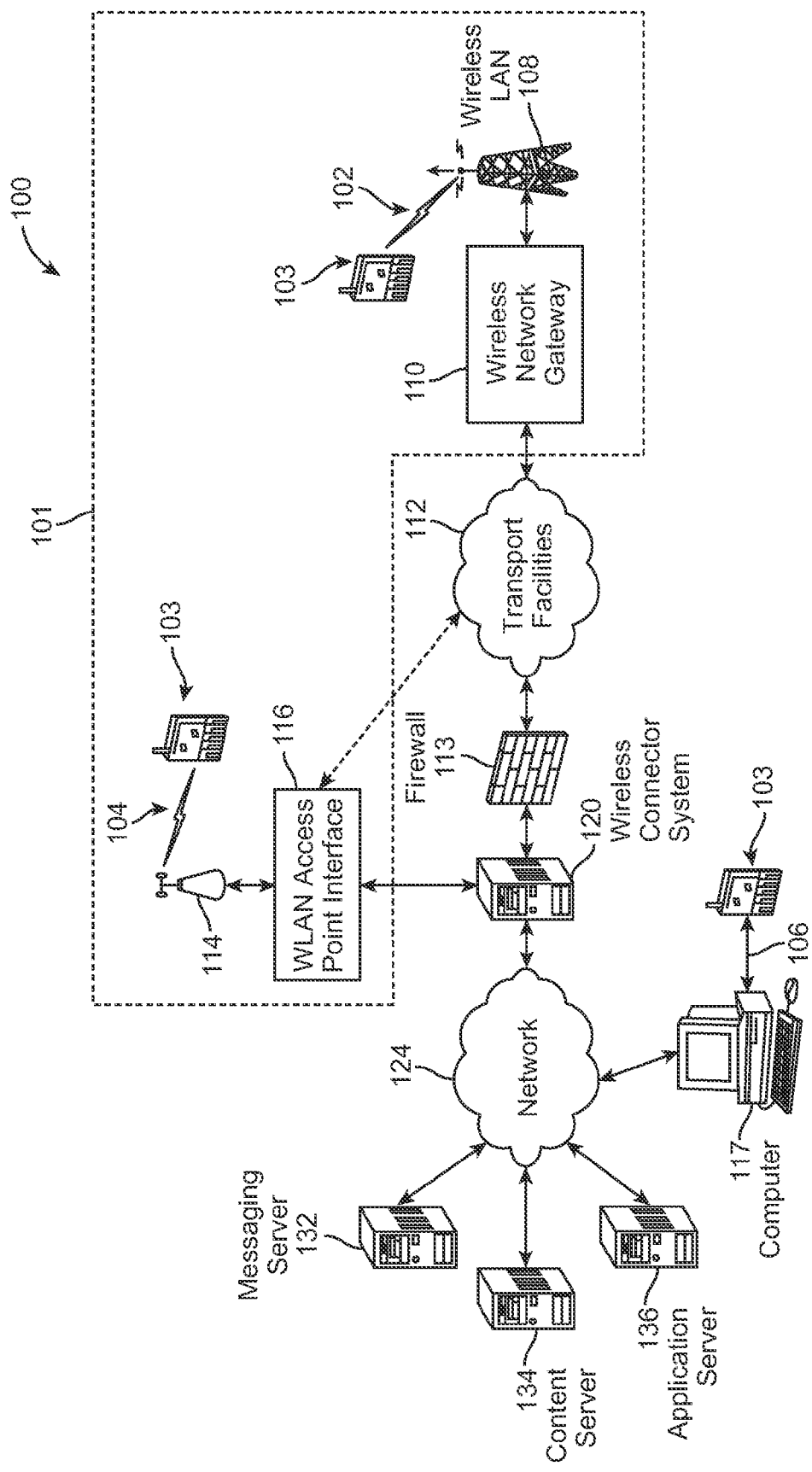
FIG. 1 illustrates a communication system including a mobile communication device to which example implementations of the technology can be applied.

In order to facilitate an understanding of environments in which example implementations described herein can operate, reference is made to FIG. 1, which shows, in block diagram form, a communication system 100 in which implementations of the technology can be applied. The communication system 100 may comprise a number of mobile communication devices 103 that may be connected to the remainder of system 100 in any of several different ways. Accordingly, several instances of mobile communication devices 103 are depicted in FIG. 1 employing different example ways of connecting to system 100.

These figures are exemplary only, and those persons skilled in the art will appreciate that additional elements and modifications may be necessary to make the communication device, e.g., 103 operable in particular network environments. While in the illustrated implementations, the communication devices, e.g., 103 may comprise smart phones, in other implementations, the communication devices may comprise personal digital assistants (PDA), tablet computers, laptop computers, desktop computers, servers, or other communication devices capable of sending and receiving electronic messages.

Mobile communication devices 103 are connected to a wireless network 101 that may comprise one or more of a Wireless Wide Area Network (WWAN) 102 and a Wireless Local Area Network (WLAN) 104 or other suitable network arrangements. In some implementations, the mobile communication devices 103 are configured to communicate over both the WWAN 102 and WLAN 104, and to roam between these networks. In some implementations, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the mobile communication devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the mobile communication devices 103 to transport facilities 112, and through the transport facilities 112 to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet), and its resources, or the wireless connector system 120 may be operated by a mobile network provider. In some implementations, the network 124 may be realized using the Internet rather than, or in addition to, an internal or enterprise network.

The wireless network gateway 110 provides an interface between the wireless connector system 120 and the WWAN 102, which facilitates communication between the mobile communication devices 103 and other devices (not shown) connected, directly or indirectly, to the WWAN 102. Accordingly, communications sent via the mobile communication devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 103.

The WLAN 104 comprises a wireless network that, in some implementations, conforms to IEEE 802.11x standards (sometimes referred to as Wi-Fi™) such as, for example, the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly, (for example, if the access point 114 is part of an enterprise WLAN 104 in which the wireless connector system 120 resides), or indirectly, as indicated by the dashed line in FIG. 1, via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that might connect to the wireless connector system 120.

The wireless connector system 120 allows the mobile communication devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to mobile communication devices 103, and intranet file services.

The wireless connector system 120 typically provides a secure exchange of data (e.g., email messages, personal information manager (PIM) data, and IM data) with the mobile communication devices 103. In some implementations, communications between the wireless connector system 120 and the mobile communication devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination mobile communication device 103. The AP interfaces 116 of the WLAN 104 provide similar sending functions between the mobile communication device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A mobile communication device 103 may alternatively connect to the wireless connector system 120 using a computer 117, such as desktop or notebook computer, via the network 124. A link 106 may be provided for exchanging information between the mobile communication device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 103. Suitable variations of the communication system will be understood to a person of skill in the art and are intended to fall within the scope of the present disclosure.

Figure 3:
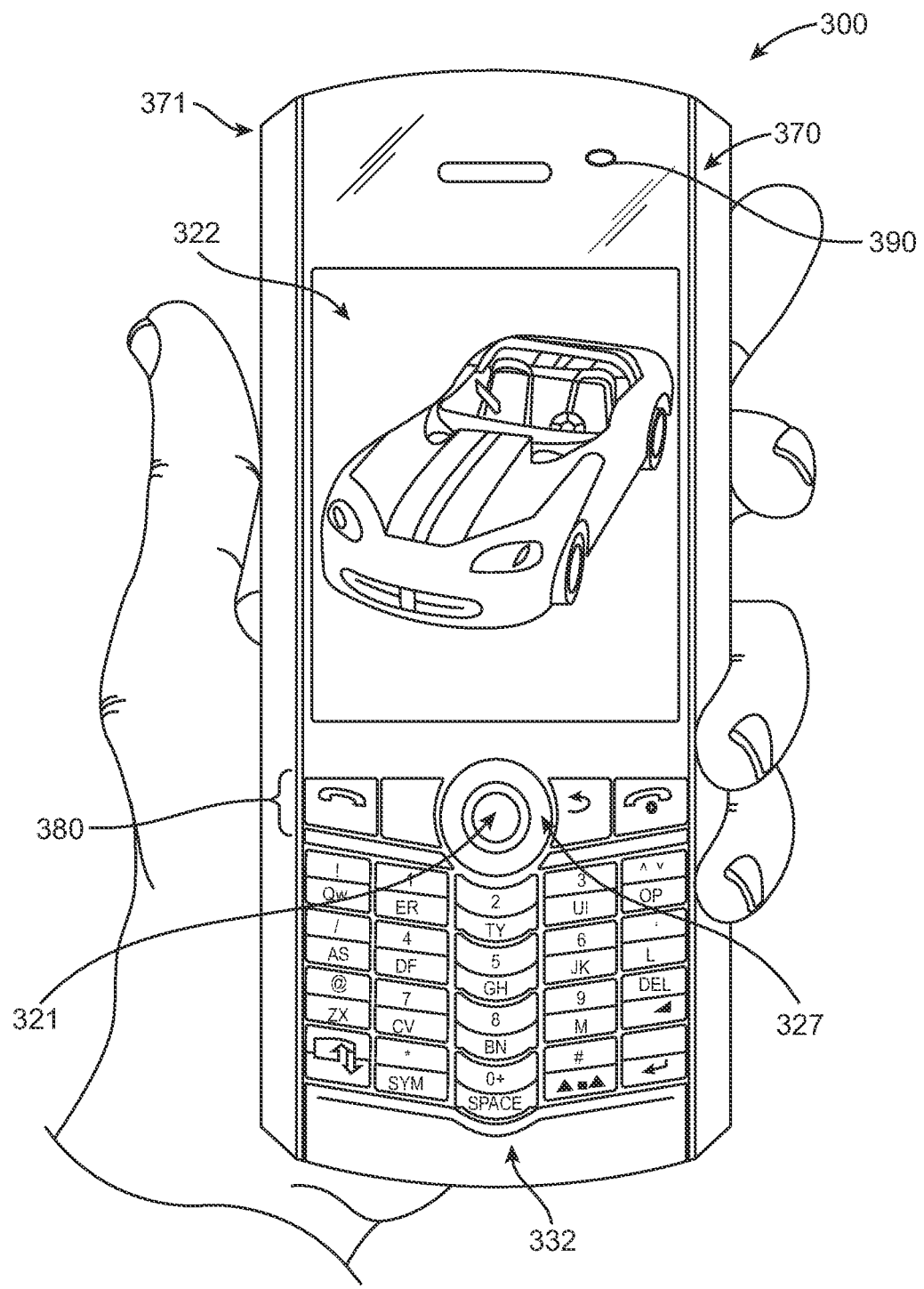
FIG. 3 illustrates a handheld communication device.

As will be appreciated from FIG. 3, an exemplary mobile communication device 300 (as an example of 103) comprises a display 322 located above a keyboard 332 constituting a user input means that is suitable for accommodating textual input to the device 300. In some implementations, the keyboard 332 can be part of a touch screen display. The front face 370 of the device 300 has a navigation row 380. As shown, the device 300 is of uni-body construction, also known as a "candy-bar" design.

The device 300 may include an auxiliary input that acts as a cursor navigation tool 327 and that may be also exteriorly located upon the front face 370 of the device 300. The front face location of a cursor navigation tool 327 allows the tool to be thumb-actuable, e.g., like the keys of the keyboard 332. Some implementations of the technology provide the navigation tool 327 in the form of a trackball 321 that may be utilized to instruct two-dimensional screen cursor movement in substantially any direction, as well as act as an actuator when the trackball 321 is depressed like a button. Other implementations can provide the navigation tool in the form of a trackpad, a touchpad, a pointing stick, joystick, graphics tablet, or combinations thereof. The placement of the navigation tool 327 can be above the keyboard 332 and below the display screen 322; here, it may avoid interference during keyboarding and does not block the operator's view of the display screen 322 during use.

The device 300 may be configured to send and receive messages. The device 300 includes a body 371 that can, in some implementations, be configured to be held in one hand by an operator of the device 300 during text entry. A display 322 is included that is located on a front face 370 of the body 371 and upon which information is displayed to the operator, e.g., during text entry. The device 300 may also be configured to send and receive voice communications such as mobile telephone calls. The device 300 also can include a camera (not shown) to allow the device 300 to take electronic photographs that can be referred to as photos or pictures. Further, the device 300 can be configured to operate a web browser.

Figure 2:
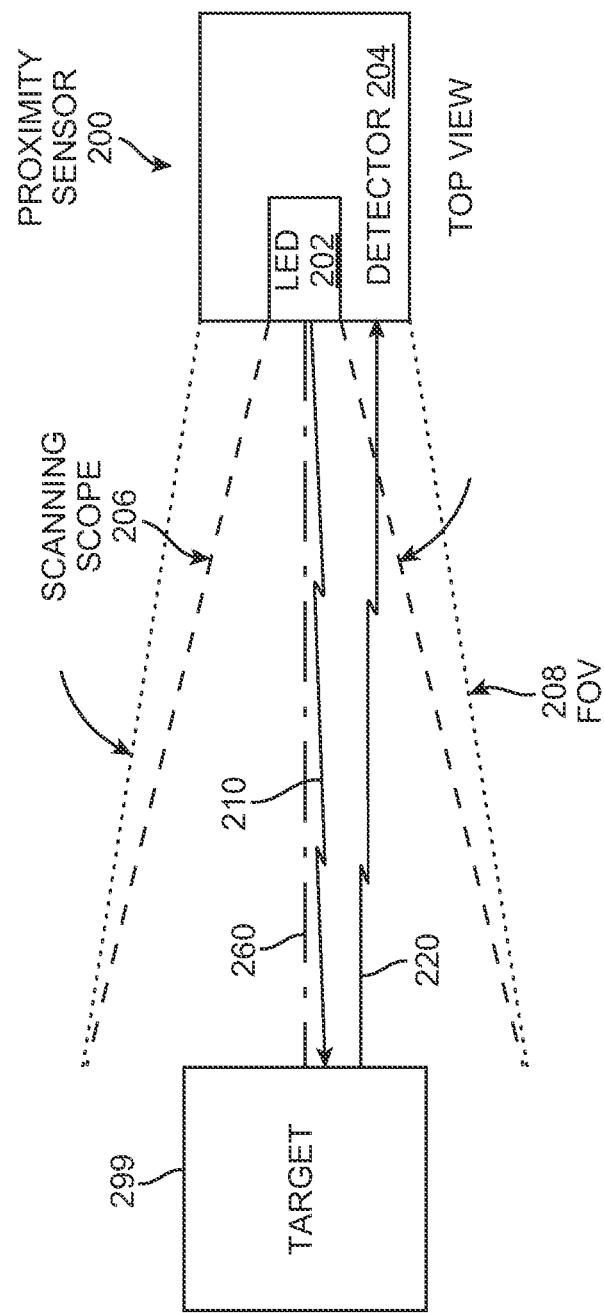
FIG. 2 illustrates a block diagram of a top side view of a proximity sensor.

The device 300 may further contain a sensor, e.g., proximity sensor, e.g., 200 of FIG. 2, behind a cover 390 mounted in an aperture 371' defined in body 371. In devices where substantially all the front face 370 of the device is a touch screen, a portion of the touch screen can constitute the cover.

Figure 4:
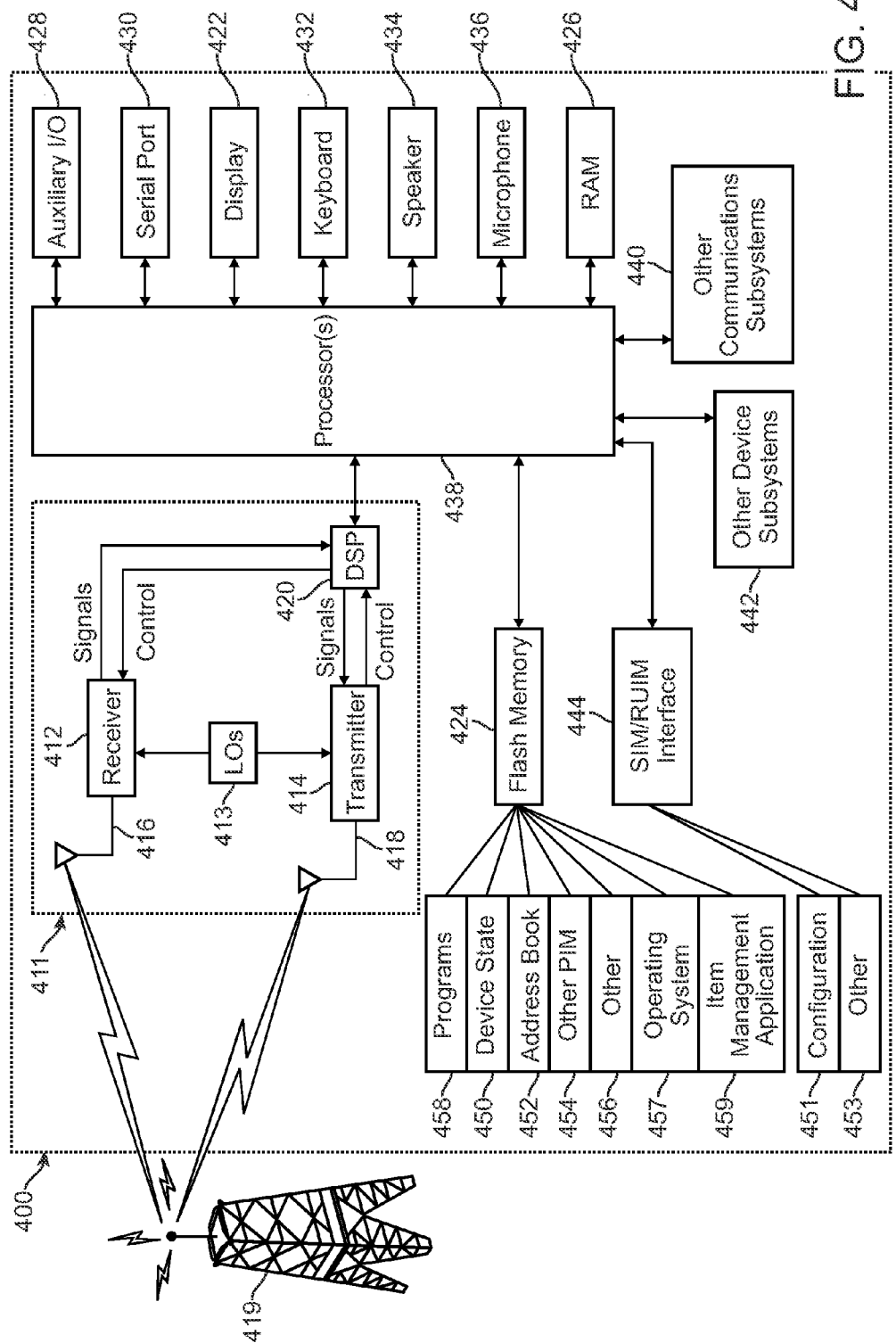
FIG. 4 illustrates a block diagram of a handheld communications device.

Referring to FIG. 4, a block diagram of a communication device, such as 300 and 103, in accordance with an exemplary implementation is illustrated. As shown, the device 400 includes a processor 438 that controls the operation of the communication device 400. A communication subsystem 411 performs communication transmission and reception with the wireless network 419. The microprocessor 438 further can be communicatively coupled with an auxiliary input/output (I/O) subsystem 428. In at least one implementation, the processor 438 can be communicatively coupled to a serial port (for example, a Universal Serial Bus port) 430 that can allow for communication with other devices or systems via the serial port 430. A display 422 (e.g., 322) can be communicatively coupled to processor 438 to allow for display of information to an operator of the communication device 400. When the communication device 400 is equipped with a keyboard 432 (e.g., 332), the keyboard can also be communicatively coupled with the processor 438. The communication device 400 can include a speaker 434, a microphone 436, random access memory (RAM) 426, and flash memory 424, all of which may be communicatively coupled to the processor 438. Other similar components may be provided on the communication device 400 as well and optionally communicatively coupled to the processor 438. Other communication subsystems 440 and other device subsystems 442 are generally indicated as being functionally connected with the processor 438 as well. An example of a communication subsystem 440 is a short range communication system such as BLUETOOTH® communication module or a WI-FI® communication module (a communication module in compliance with IEEE 802.11b) and associated circuits and components. Examples of other device subsystem 442 include sensor 200 of FIG. 2 and implementations of the present technology.

Additionally, the processor 438 is able to perform operating system functions and enables execution of programs on the communication device 400. In some implementations not all of the above components are included in the communication device 400. For example, in at least one implementation, the keyboard 432 is not provided as a separate component and is instead integrated with a touch screen as described below.

The auxiliary I/O subsystem 428 can take the form of a variety of different navigation tools (multi-directional or single-directional) such as a trackball navigation tool 321, as illustrated in the exemplary implementation shown in FIG. 3, or a thumbwheel, a navigation pad, a joystick, touch-sensitive interface, or other I/O interface. These navigation tools may be located on the front surface of the communication device 400 or may be located on any exterior surface of the communication device 400. Other auxiliary I/O subsystems may include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys may be placed along the side of the communication device 300 to function as escape keys, volume control keys, scrolling keys, power switches, or user programmable keys, and may likewise be programmed accordingly.

The keyboard 432 can include a plurality of keys that can be of a physical nature such as actuable buttons, or they can be of a software nature, typically constituted by representations of physical keys on a display 422 (referred to herein as "virtual keys"). It is also contemplated that the user input can be provided as a combination of the two types of keys. Each key of the plurality of keys is associated with at least one action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display 422, which in one implementation is enabled by touching the display 422, for example, with a stylus, finger, finger tip, finger nail, or other pointer, to generate the character or activate the indicated command or function. Some examples of displays 422 capable of detecting a touch include resistive, capacitive, projected capacitive, infrared and surface acoustic wave (SAW) touch screens.

Physical and virtual keys can be combined in many different ways as appreciated by those skilled in the art. In one implementation, physical and virtual keys are combined such that the plurality of enabled keys for a particular program or feature of the communication device 400 is shown on the display 422 in the same configuration as the physical keys. Using this configuration, the operator can select the appropriate physical key corresponding to what is shown on the display 422. Thus, the desired character, command or function is obtained by depressing the physical key corresponding to the character, command or function displayed at a corresponding position on the display 422, rather than touching the display 422.

Furthermore, the communication device 400 is equipped with components to enable operation of various programs, as shown in FIG. 4. In an exemplary implementation, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators typically can interact directly with the operating system 457 through a user interface usually including the keyboard 432 and display 422. While in an exemplary implementation the operating system 457 is stored in flash memory 424, the operating system 457 in other implementations is stored in read-only memory (ROM) or similar storage element (not shown). As those skilled in the art will appreciate, the operating system 457, device program 458, or parts thereof, may be loaded in RAM 426 or other volatile memory.

In some implementations, the flash memory 424 may contain programs 458 for execution on the device 400, including—but not limited to—an address book 452, a personal information manager (PIM) 454, and a device state 450. Furthermore, programs 458, such as social software, and other information 456 including data can be segregated upon storage in the flash memory 424 of the device 400.

When the communication device 400 is enabled for two-way communication within the wireless communication network 419, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-T9), Ultra Mobile Broadband (UMB) networks, Worldwide Interoperability for Microwave Access (WiMAX), and other networks that can be used for data and voice, or just data or voice. For the systems listed above, the communication device 400 may use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable User Identity Module (RUIM) in order to communicate with the CDMA network. The RUIM and SIM card can be used in multiple different communication devices 400. The communication device 400 can be configured to operate some features without a SIM/RUIM card, but it will not necessarily be able to communicate with the network 419. A SIM/RUIM interface 444 located within the communication device 400 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the device 400 can be equipped with an integral or internal antenna 418 for transmitting signals to the communication network 419. Likewise the device 400 can be equipped with another antenna 416 for receiving communication from the communication network 419. These antennae (416, 418) in another exemplary implementation are combined into a single antenna (not shown). As one skilled in the art would appreciate, the antenna or antennae (416, 418) in another implementation can be externally mounted on the communication device 400.

When equipped for two-way communication, the communication device 400 features a communication subsystem 411. As is understood in the art, this communication subsystem 411 is modified so that it can support the operational needs of the communication device 400. The subsystem 411 includes a transmitter 414 and receiver 412 including the associated antenna or antennae (416, 418) as described above, local oscillators (LOs) 413, and a processing module that in the presently described exemplary implementation is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice or data, or both voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated. Device 400 can include programs such as a web browser, a file browser, and client programs for interacting with server programs. Devices, e.g., 103, 300, 400, for use in the technology can be characterized by an identification number assigned to the device. Such identification numbers cannot be changed and are locked to each device.

Implementations of the technology can be realized as including programming on a mobile communications device, e.g., 103. In some implementations, programming for the technology is on the mobile communications device 103, while data used by the mobile communications device 103 is on the wireless connector system 120 or a network server such as content server 134, messaging server 132, or application server 136. In some implementations, programming for the technology can be realized on a remote server. Allocation of functionality among architectural elements can be a function of several factors including latency, processing resource availability and efficient usage, storage availability and efficient usage, and revenue opportunities.

As noted herein with respect to FIG. 3, device 300 can contain a proximity sensor. A typical proximity sensor can detect the presence of an object proximate to the sensor without physical contact between the object and the sensor. Typical active proximity sensors emit an electromagnetic or electrostatic field, or a beam of electromagnetic radiation, and can detect changes in the field or in a return signal. The object being sensed is typically referred to as the proximity sensor's "target." The area where the sensor is design to detect a proximate target can be referred to as the "target area."

Referring to FIG. 2, an IR proximity sensor 200 can emit beams of invisible IR radiation 210 from an IR energy source, e.g., an LED 202. A detector 204 of the proximity sensor 200 detects reflections 220 of this radiation. These reflections 220 allow the IR proximity sensor 200 to determine whether there is a target 299 nearby. For the purpose of this disclosure, "light" refers to electromagnetic energy in the ultraviolet, visible, and infrared portions of the electromagnetic spectrum; and the energy source also is referred to as a "light source" and an "emitter" While the target is shown having a uniform surface for simplicity of illustration, targets can have non-uniform surfaces.

A proximity sensor LED 202 can be characterized by a scanning scope, e.g., the volume to which a substantial majority of the reflectable energy of the light source 202 is emitted. FIG. 2 illustrates the top view plane scanning scope 206 of the light source 202 in a view labeled "TOP VIEW." A typical scanning scope for a proximity sensor light source is fifteen (15) degrees, though the drawings are not necessarily to proportion in order to more clearly convey the concepts. The detector 204 can likewise be characterized by a field of view (FOV), e.g., the volume from which the detector can effectively detect energy. FIG. 2 illustrates the top view plane detector FOV 208. For simplicity, scanning scope 206 and FOV 208 are shown as substantially symmetrical about a common axis 260.

Figure 5:
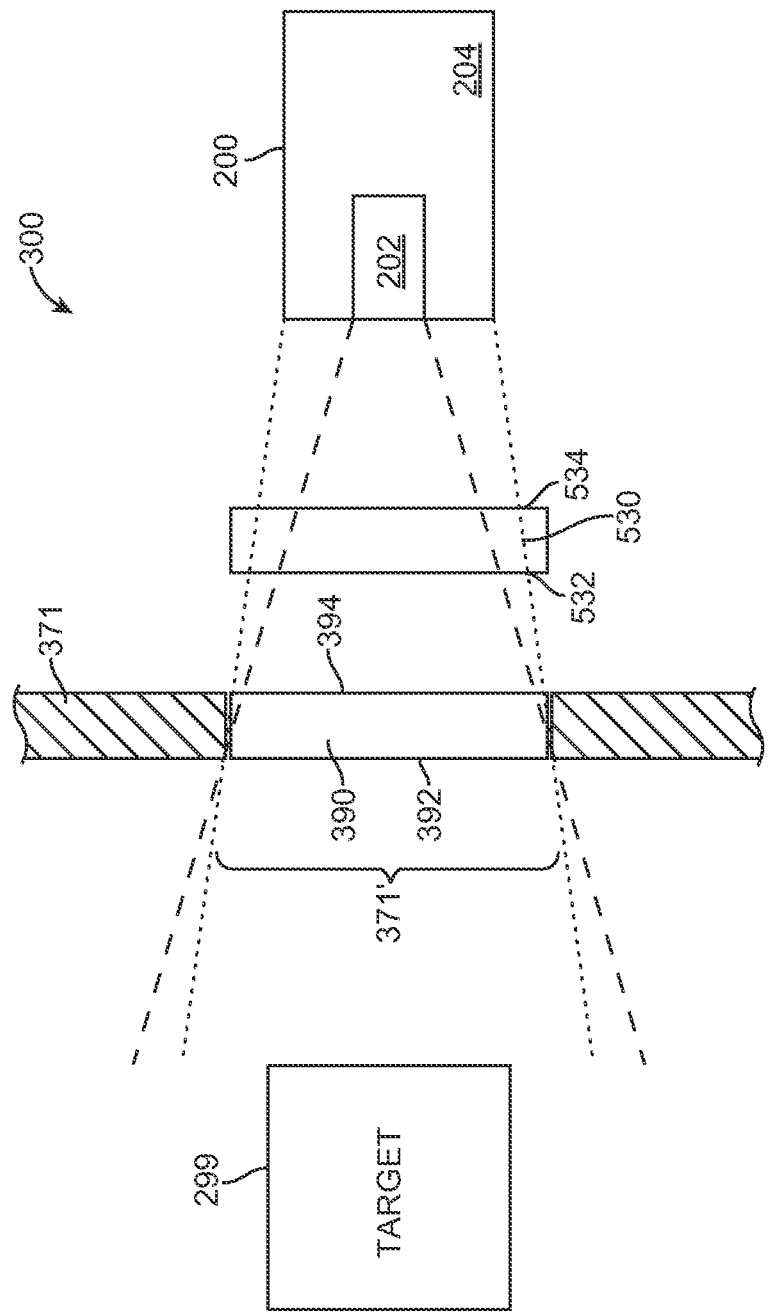
FIG. 5 illustrates a notional diagram of the field-of-view (FOV) of a proximity sensor installed in a mobile communication device.

Referring to FIG. 5, a typical IR proximity sensor 200 is shown in as typically installed in a mobile device 300. Device body 371 defines an aperture 371' therein. Embodiments of the present technology include elements substantially at the device body 371 and interior to the device body 371. As in FIG. 2, the proximity sensor 200 includes an light source 202 and a detector 204. A cover 390 can be mounted in the aperture 371'. As mounted, the cover 390 has a cover exterior-facing surface 392 and a cover interior-facing surface 394—where "interior facing" and "exterior facing" are with respect to the device body 371. The cover is typically transparent to the light over the frequency range used in the proximity sensor. Additional components, e.g., light guide 530 having light guide exterior-facing surface 532 and light guide interior facing surface 534, can be included in the mobile device in conjunction with proximity sensor 200.

Figure 14:
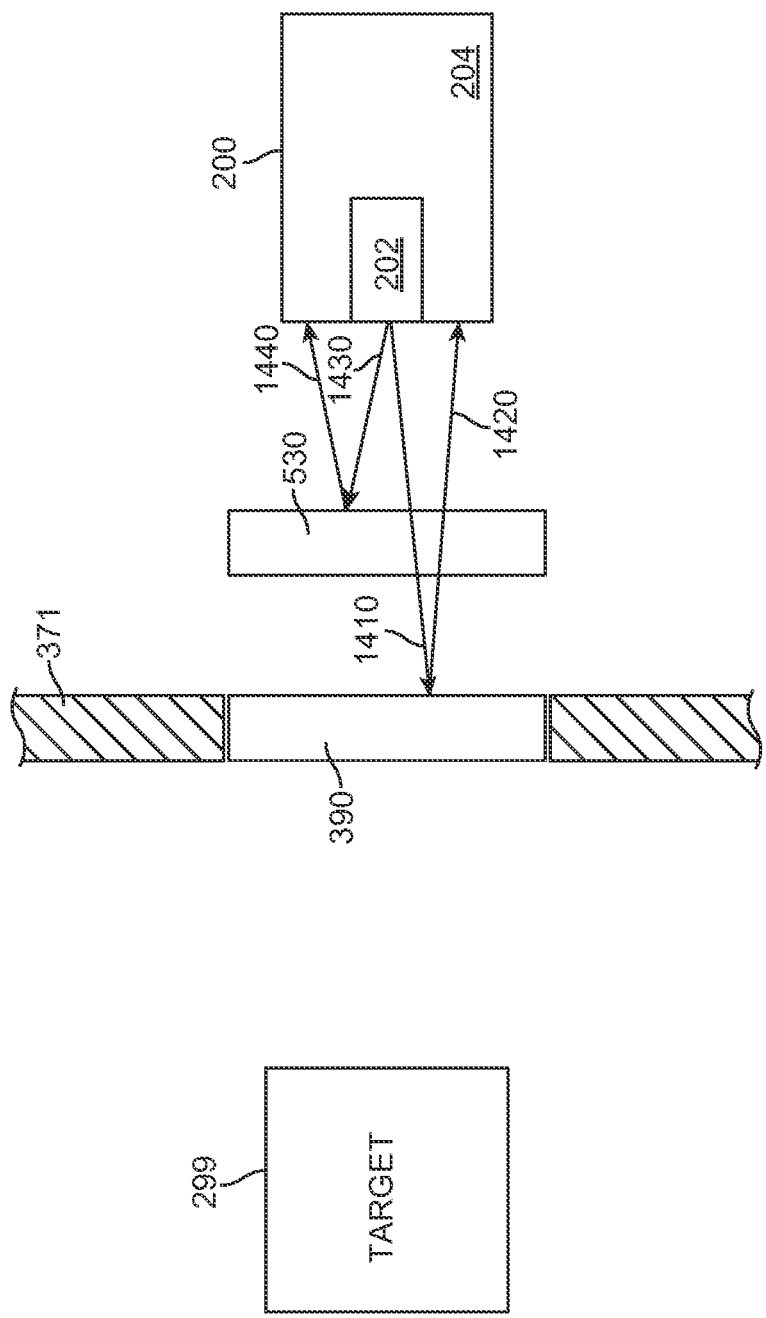
FIG. 14 illustrates example sources of noise in the configuration of FIG. 5.
Figure 15:
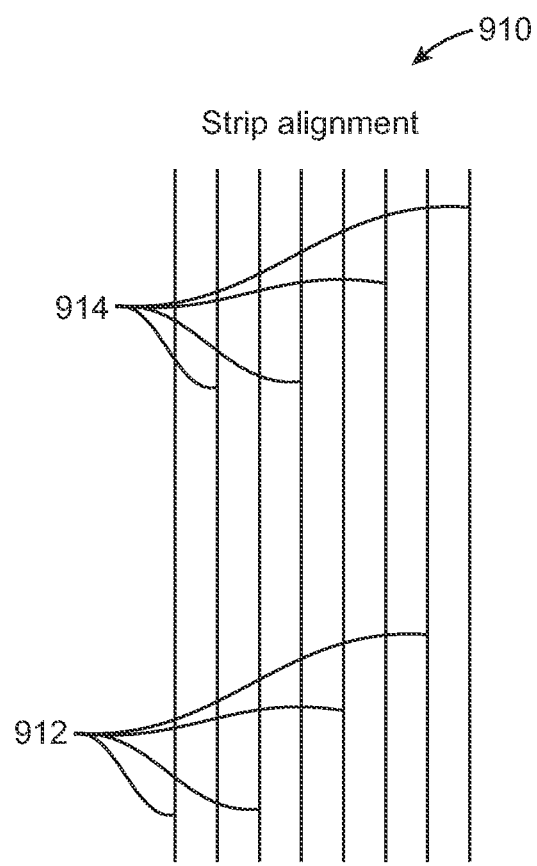
FIG. 15 illustrates a facet configuration of microprisms and alignment of microprism arrays.
Figure 16:
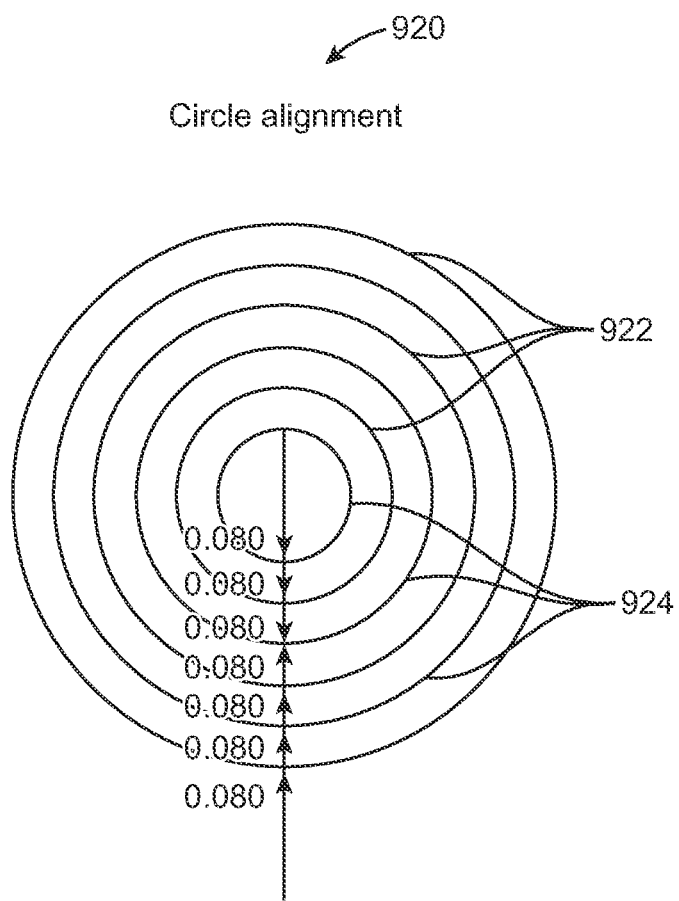
FIG. 16 illustrates a facet configuration of microprisms and alignment of microprism arrays.
Figure 17:
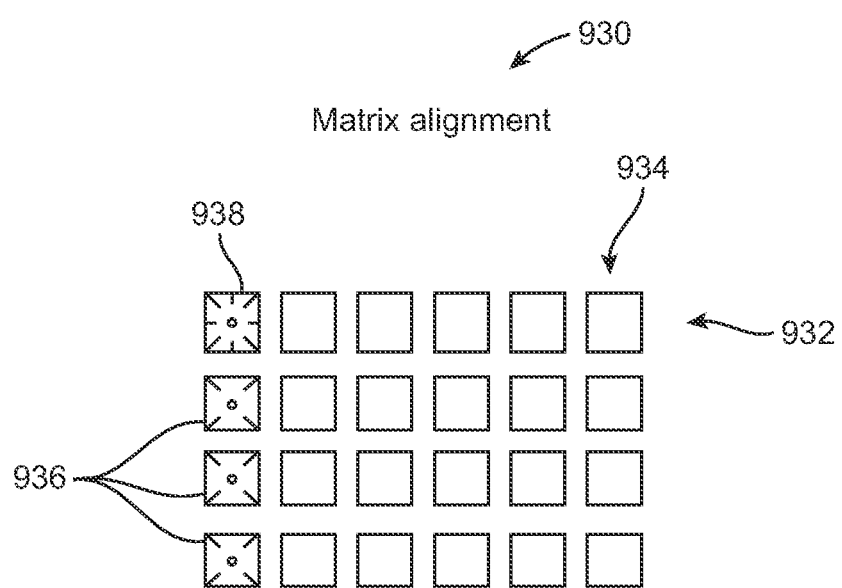
FIG. 17 illustrates a facet configuration of microprisms and alignment of microprism arrays.
Figure 18:
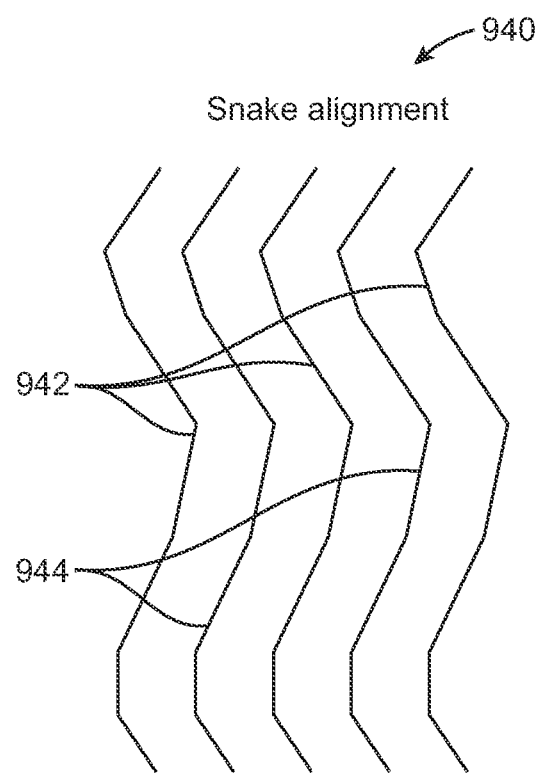
FIG. 18 illustrates a facet configuration of microprisms and alignment of microprism arrays.
Figure 19:
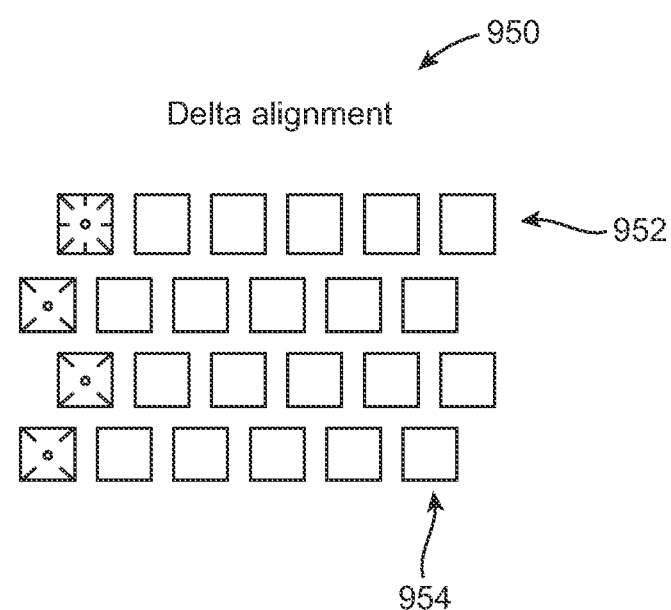
FIG. 19 illustrates a facet configuration of microprisms and alignment of microprism arrays.

As noted elsewhere herein, proximity sensors can be susceptible to false readings due detection of energy other than emitted energy 210 reflected off an intended target, e.g., 299. Referring to FIG. 14, in many IR proximity sensor applications, IR radiation 1410 from the energy source 202 may reflect off the cover 390 as energy 1420 back on the detector 204, as shown in FIG. 14, and cause noise issues. Other modes of reflection and refraction between the proximity sensor 200 and objects other than the target 299 can also produce noise in a proximity sensor, e.g., energy 1430 reflected off light guide 530 as energy 1440 and incident on detector 204. Using a narrow output angle for the energy source 220 can mitigate such noise, but will impact the scanning scope of the device. Providing a textured cover exterior-facing surface 392 also can mitigate noise, however users of mobile communication devices may be concerned with appearance of the device in addition to device functionality. Such users may not desire a textured surface to the exterior of the cover.

Additionally, while it is desirable to increase the field-of-view (FOV) of the detector, mobile communication device geometries limit the FOV achievable with conventional technology. Further, the limited power available in mobile devices incentivizes design approaches that are energy efficient. Even further yet, it can be advantageous to pair an energy source and a detector that are not substantially co-located as shown in FIG. 2, FIG. 5, and FIG. 14.

Implementations of the present technology include light focusing devices, e.g., microlenses, microprisms, conventional lenses, Fresnel lenses, and arrays of each, to focus light from the light source, and to focus light reflected off a target to improve scanning scope and FOV. Generally, focusing devices can include converging lenses (with positive focal length) such as bi-convex and plano-convex simple lenses, diverging lenses (with negative focal length) such as biconcave and plano-concave simple lenses, microlens arrays, microprism arrays, and Fresnel lenses.

Figure 6:
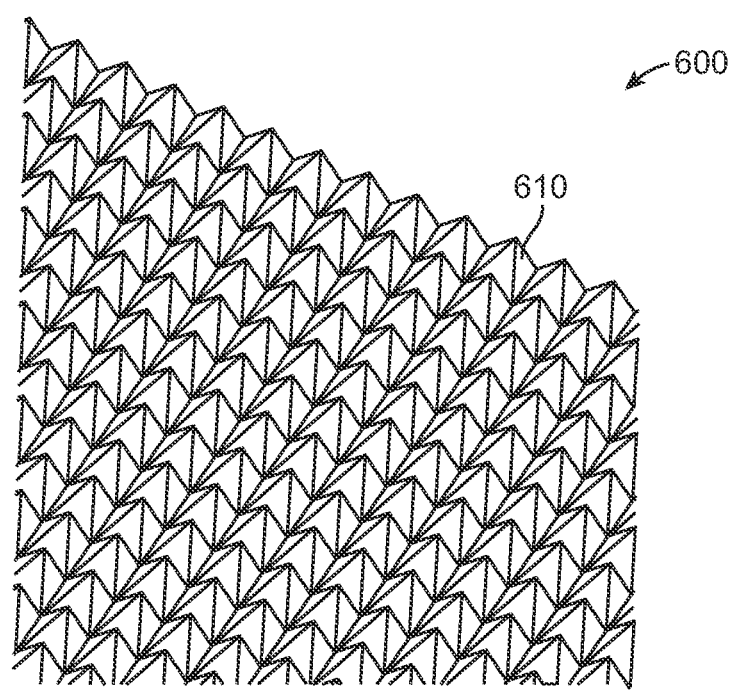
FIG. 6 illustrates a section of a microprism array.

Referring to FIG. 6 a section of a microprism array lens 600 is shown. In the illustrated section, each microprism 610 has four asymmetrically disposed (4) facets—though only three (3) are visible in FIG. 6. Other facet arrangements are available, e.g., as described below, including symmetrically disposed pyramid facets. In the illustrated section, the microprisms 610 are arranged in a regular row, e.g., 620, by column, e.g., 630 array, though other arrangements are contemplated as described below.

Figure 7:
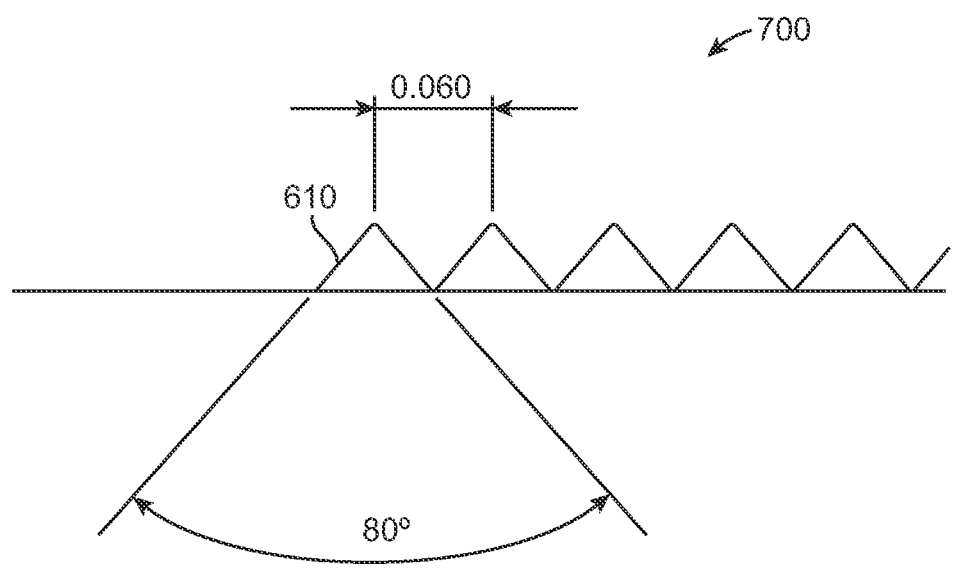
FIG. 7 illustrates details of a microprism array

FIG. 7 illustrates relative geometry 700 between typical microprisms (here shown as a single row of a matrix microprism array). The illustrated microprisms, e.g., 610, are 0.060 mm wide spaced on 0.060 mm centers (pitch), other geometries, including pitch greater than microprism width are contemplated. The angle 720 between facets is shown as 80 degrees, though other angles are contemplated, with steeper angles generally giving greater angles to the edge of the FOV. For example, to obtain the benefits of the present technology, each of prism pitch and prism width can vary between 0.01 mm and 2 mm, while prism angle can vary between 30 degrees and 160 degrees.

Figure 8:
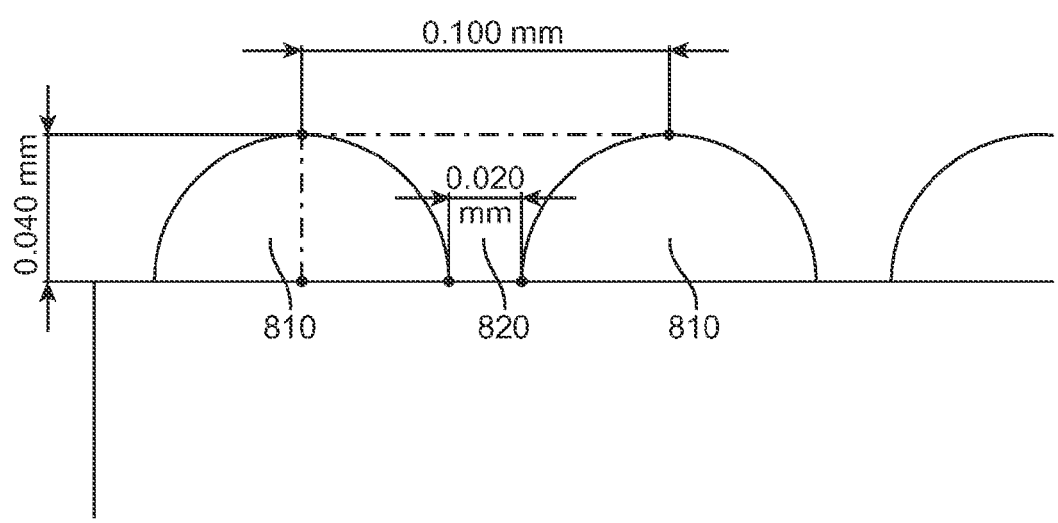
FIG. 8 illustrates details of a microlens array.
Figure 9:
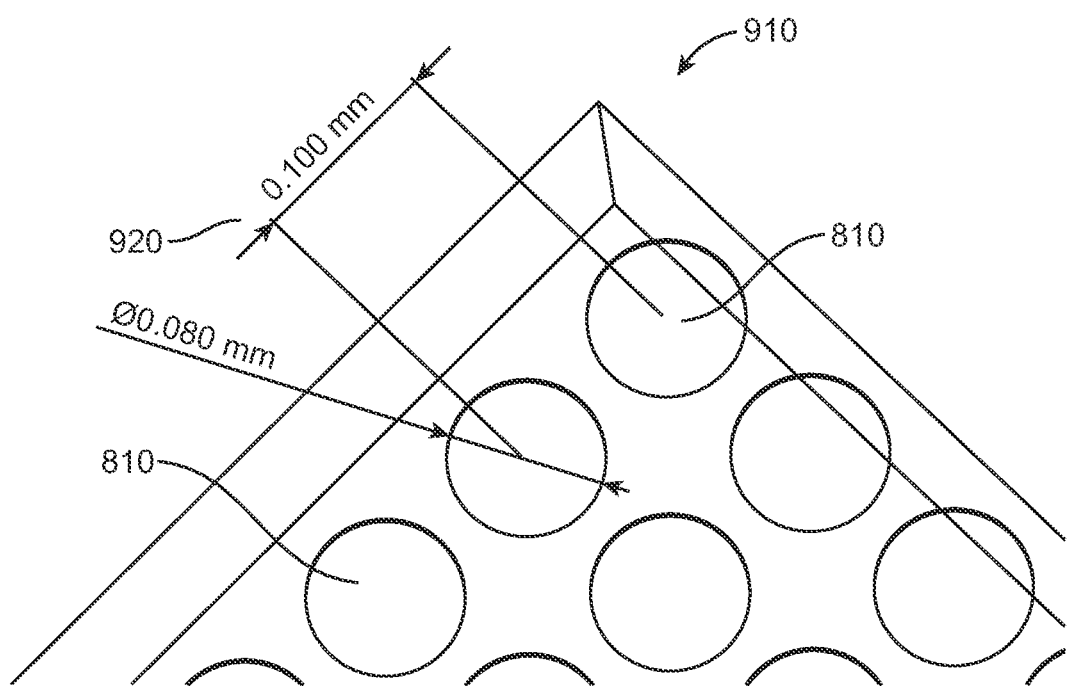
FIG. 9 illustrates a section of a microlens array.

Referring to FIG. 8 and FIG. 9, microlenses, e.g., 1410, are small lenses, generally with diameters less than a millimeter (mm) and often as small as 10 micrometers (μm). FIG. 9 shows convex microlenses 1410 with a diameter 920 of 0.080 mm and spaced on 0.100 mm centers. Other simple lens types can be used. Microlens arrays can contain multiple lenses formed in a one-dimensional or two-dimensional array, e.g., 910 showing a section of a rectangular microlens array, on a supporting substrate. If the individual lenses have circular apertures and are not allowed to overlap they may be placed in a hexagonal array to obtain maximum coverage of the substrate. However there will still be gaps, e.g., 1420, between the lenses that can be reduced by making the microlenses with non-circular apertures.

FIGS. 15-19 illustrate various microprism facets and array alignments, i.e., strip array alignment 910 in which the lines 912 represent peaks and lines 914 represent troughs; circle alignment 920 in which the lines 922 represent peaks and lines 924 represent troughs; matrix alignment 930 in which the microprisms are arrayed in rows, e.g., 932, and columns, e.g., 934 and example four-facet symmetrical microprisms 936 and an eight-facet symmetrical microprism 938 are shown; snake alignment 940 in which lines 942 represent peaks and lines 944 represent troughs; and delta alignment 950 similar to matrix alignment 930 except that columns 954 are offset every other row 952. Each combination of microarray characteristics, e.g., alignment, number of facets, orientation of facets, symmetry among facets of a microprism (for directing one or both of scanning scope and FOV), and space between features, can produce a different scanning scope (if the microarray is placed in the energy path of the energy source) and FOV (if the microarray is placed in the energy path of the detector). The alignments also represent examples of other light focusing device array alignments.

Implementations of the present technology include proximity sensor assemblies and electronic devices with at least one light focusing device, e.g., a microprism array, on at least one surface in the device within at least one of the scanning scope and FOV of at least one proximity sensor of the device. Including a light focusing device such as a microprism array in an optical path between at least one element of a proximity sensor and the exterior of a device can be used to: increase the outer limits of the scanning scope (e.g., when placed in the optical path of the energy source) and FOV (e.g., when placed in the optical path of the detector); change the axis of the scanning scope and FOV (e.g., for aligning the axis with anticipated target positions, for locating the energy source separate from the detector such as when a common energy source and multiple detectors are used), focusing emitted or reflected proximity sensor energy (e.g., focusing outbound energy from narrow-beam LED to decrease reflection from the device body and internal components, then broaden outer boundaries of the scanning scope; focusing inbound energy to increase FOV an increase the percentage of such energy that reaches detector), while achieving cosmetic traits with less effect on performance than non-light focusing device features.

Figure 10:
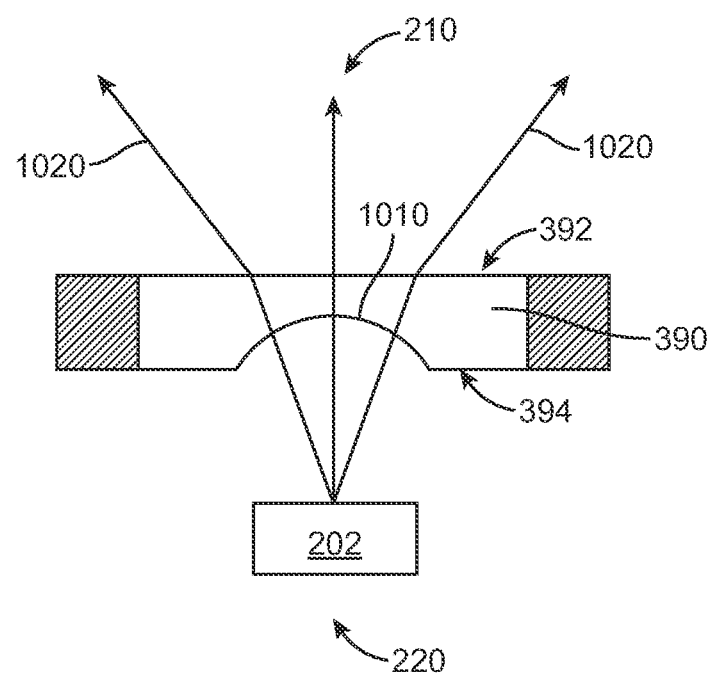
FIG. 10 illustrates a diverging light focusing device of the technology integrated into a cover lens over an emitter.

Referring to FIG. 10—FIG. 13, implementations of the technology using simple lenses are shown. In FIG. 10 a cover lens 390 as a plano-concave lens—with concave portion 1010 on the inside 394 of the cover lens 390 over the emitter 202 is shown. This configuration can be used to increase the scanning scope 206 of the proximity sensor, e.g., as indicated by rays 1020.

Figure 11:
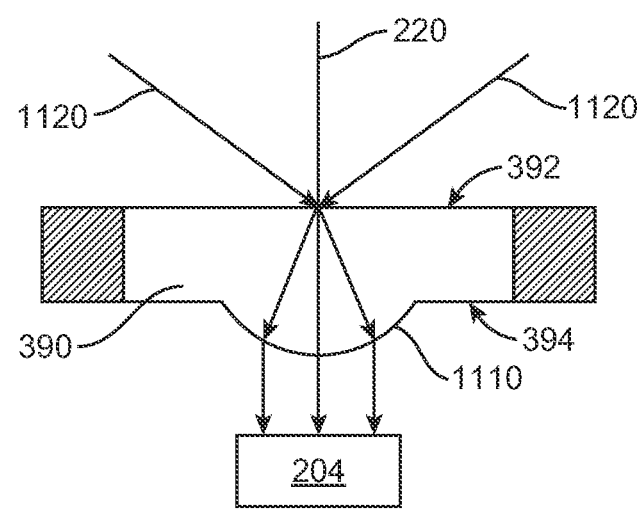
FIG. 11 illustrates a converging light focusing device of the technology integrated into a cover lens over a detector.

In FIG. 11 a cover lens 390 as a plano-convex lens—with convex portion 1110 on the cover lense interior surface 394 over the detector 204 is shown. This configuration can be used to increase the FOV 208 of the proximity sensor, e.g., as indicated by rays 1120.

Figure 12:
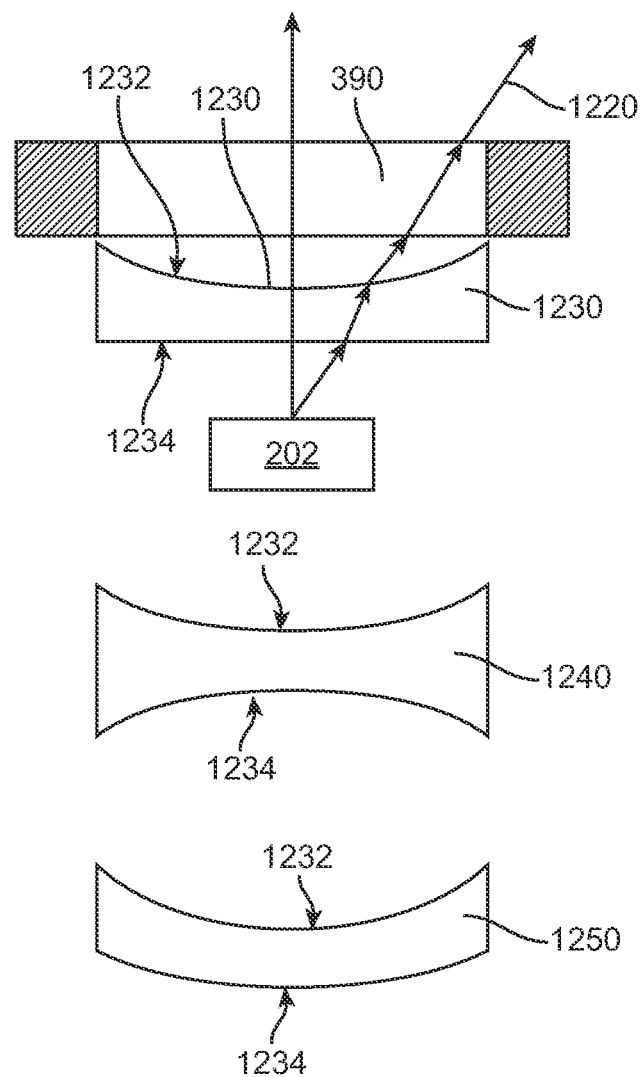
FIG. 12 illustrates several diverging light focusing devices of the technology, with a bi-concave lens integrated into a light guide.

In FIG. 12 a conventional cover lens 390 and a light guide 1230 are shown as part of the implementation over an emitter 202. The light guide 1230 is shown as a plano-concave simple lens with concave portion 1232 as the light guide exterior portion 1232. This configuration can provide increased scanning scope, e.g., as indicated by rays 1220. Both a bi-concave simple lens 1240 and negative meniscus simple lens 1250 also can be used in this configuration. Each of plano-concave lens 1230, bi-concave lens 1240, and negative meniscus lens 1250 can be used to increase the scanning scope when placed over the emitter 202.

Figure 13:
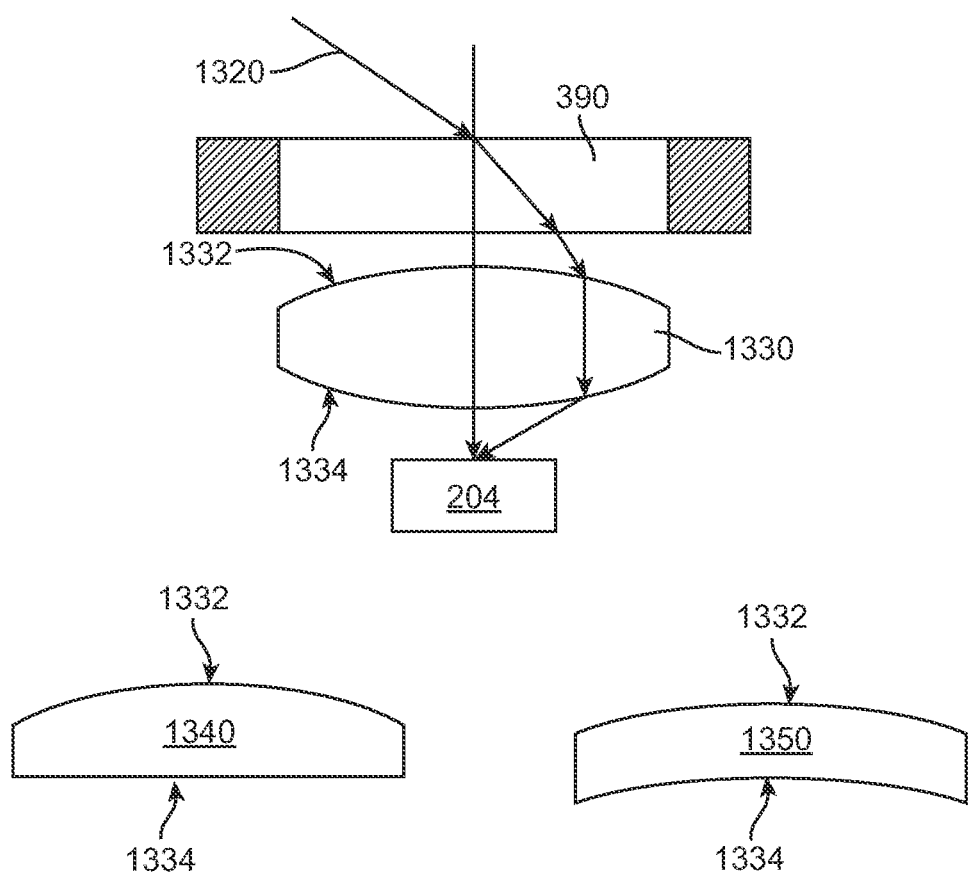
FIG. 13 illustrates several converging light focusing devices of the technology, with a bi-convex lens integrated into a light guide.

In FIG. 13 a conventional cover lens 390 and a light guide 1330 are shown as part of the implementation over a detector 204. The light guide 1330 is shown as a bi-convex simple lens. This configuration can provide increased FOV as indicated by rays 1320. Both a plano-convex simple lens 1340 and negative meniscus simple lens 1350 also can be used in this configuration. Each of plano-concave lens 1330, bi-concave lens 1340, and negative meniscus lens 1350 can be used to increase the proximity sensor FOV 208 when placed over the emitter 202.

Referring to FIG. 20-FIG. 25, various implementations of the technology using microprism arrays installed in a mobile electronic device are shown. In these implementations, the emitter 202 and the detector 204 are shown separately to convey that an emitter 202 and a detector (including a plurality of detectors) can be separately located on a device 300.

Figure 20:
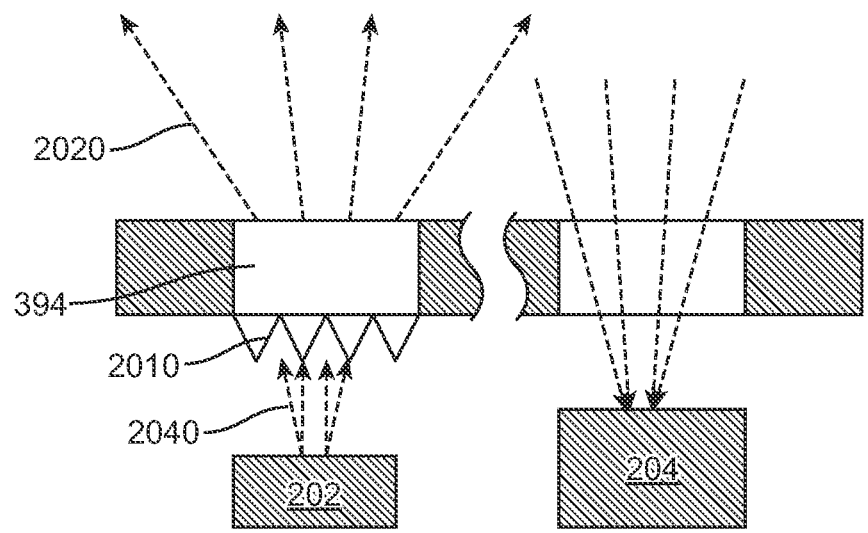
FIG. 20 illustrates implementations of the technology using microprism arrays installed in a mobile electronic device.

In embodiments of the technology such as those shown in FIG. 20, a microprism array lens 2110 is disposed on the cover lens interior surface 394 over an emitter 202 to increase the scanning scope of the emitter as shown by the increased divergence of rays 2040 from rays 2020.

Figure 21:
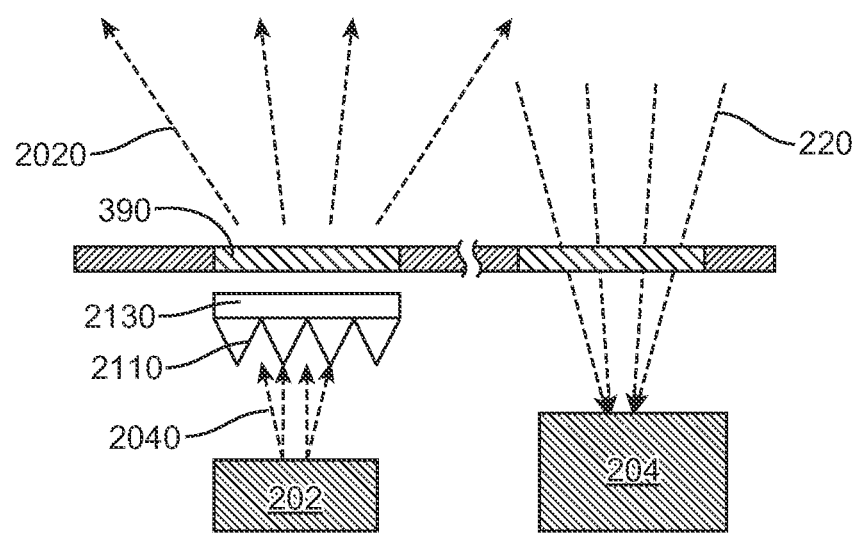
FIG. 21 illustrates implementations of the technology using microprism arrays installed in a mobile electronic device.

In embodiments of the technology such as those shown in FIG. 21, a microprism array lens 2110 is disposed in a light guide 2130 interior surface over an emitter 202 to increase the scanning scope of the emitter as shown by the increased divergence of rays 2040 from rays 2020.

Figure 22:
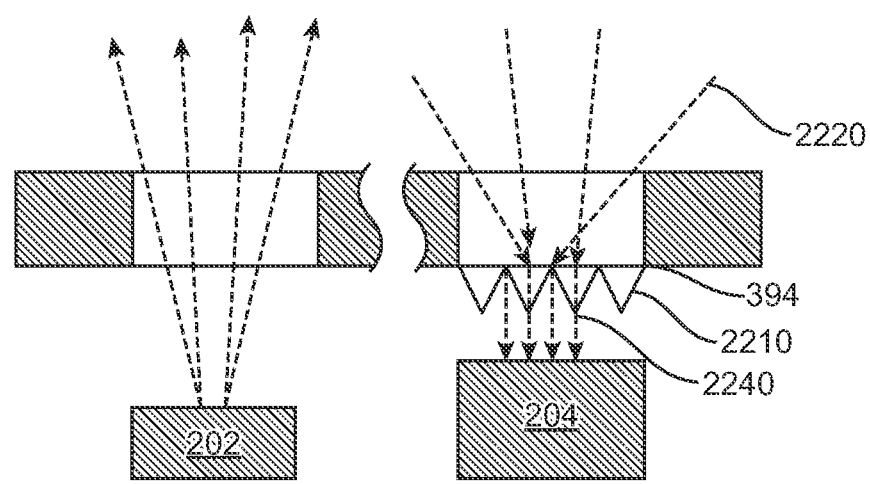
FIG. 22 illustrates implementations of the technology using microprism arrays installed in a mobile electronic device.

In embodiments of the technology such as those shown in FIG. 22, a microprism array lens 2210 is disposed on the cover lens interior surface 394 over an detector 204 to increase the FOV of the detector 204 as shown by the greater divergence of rays 2240 over rays 2220.

Figure 23:
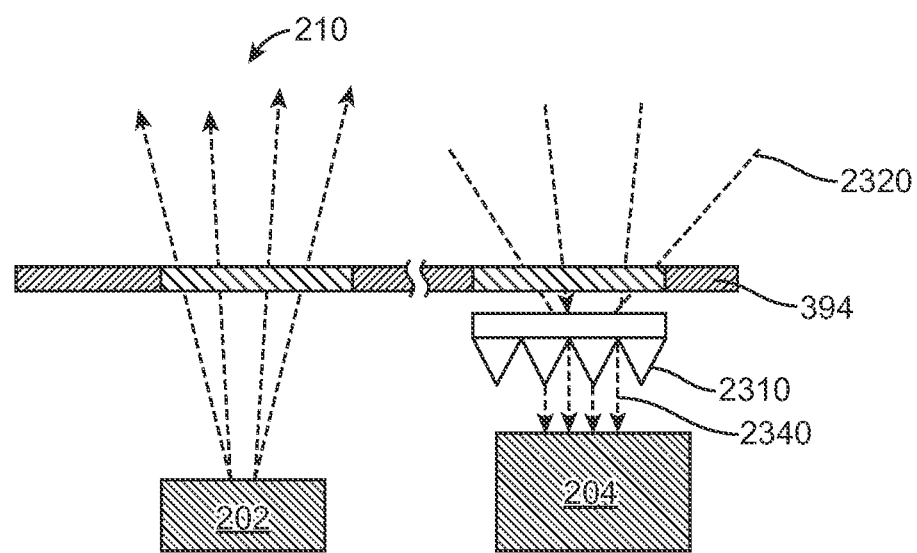
FIG. 23 illustrates implementations of the technology using microprism arrays installed in a mobile electronic device.

In embodiments of the technology such as those shown in FIG. 23, a microprism array 2310 is disposed in a light guide 2330 interior surface over a detector 204 to increase the FOV of the detector 204 as shown by the greater divergence of rays 2340 over rays 2320.

Figure 24:
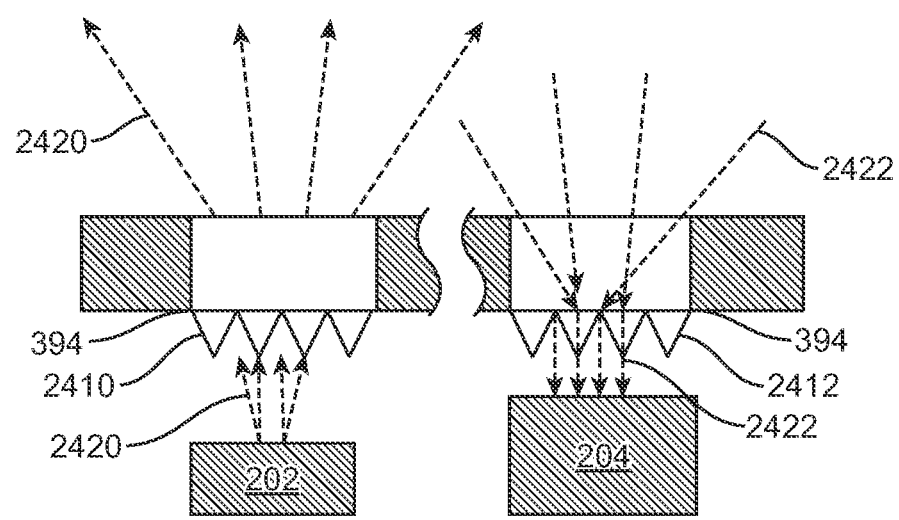
FIG. 24 illustrates implementations of the technology using microprism arrays installed in a mobile electronic device.

In embodiments of the technology such as those shown in FIG. 24—microprism array lenses 2410 and 2412 are each disposed on a cover lens interior surface 394 of a cover lens over the emitter 202 and detector 204 respectively. The microprism array lens 2410 increases the scanning scope of the detector 202 as indicated by the increased range of angles between rays 2420 and 2440. The microprism array lens 2412 increases the FOV of the detector 204 as indicated by the lesser angle range of rays 2412 compared to rays 2422.

Figure 25:
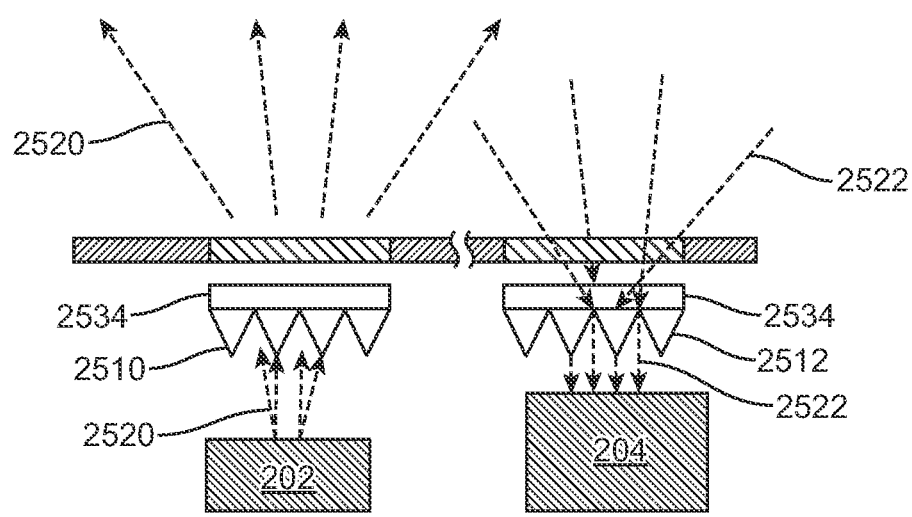
FIG. 25 illustrates implementations of the technology using microprism arrays installed in a mobile electronic device.

In embodiments of the technology such as those shown in FIG. 25, microprism array lenses 2510 and 2512 are each disposed on a light guide interior surface 2534 over the emitter 202 and detector 204 respectively. The microprism array lens 2510 increases the scanning scope of the detector 202 as indicated by the increased range of angles between rays 2520 and 2440. The microprism array lens 2512 increases the FOV of the detector 204 as indicated by the lesser angle range of rays 2512 compared to rays 2522.

Other implementations of the technology include using light focusing devices of various types within one electronic device, e.g., a microprism array over the emitter to increase the limits of the scanning scope, and a plano-concave lens (or a plano-concave microlens array) on the underside of the cover over a detector to increase the FOV of that detector.

Devices employing proximity detectors disclosed herein are intended to operate at least in part by sensing energy reflected off a user from an energy source located in the device. Such devices are typically handheld, and as such, have limited batteries, making power consumption of the energy source, e.g., LED laser, an important concern. In some implementations, the present technology uses an ambient light sensor to determine the ambient light. The device then determines an energy source setting at a margin above the minimum energy expected to be required for proper operation of the proximity sensor given the ambient light conditions.

In some implementations, the technology includes an electronic device comprising a body defining an aperture, a speaker, a microprism array lens, mounted in the aperture; and a proximity sensor. The proximity sensor comprising an energy source. The proximity sensor is positioned behind the microprism array lens in the interior of the body. The proximity sensor is operative to signal the proximity of an object to the proximity sensor. The electronic device also includes a processor in communication with the speaker and the proximity sensor. The electronic device further includes a computer program product comprising at least one computer readable medium, and at least one program module. The program module is stored on the medium and is operable upon execution by the processor to control the volume of the speaker at least in part as a function of the proximity sensor signal.

In some implementations, the device further includes an ambient light sensor in communication with the at least on processor. In those implementations, the proximity sensor includes an energy source in communication with the at least one processor, and the computer program product controls the energy of the energy source at least in part as a function of the sensed ambient light. In some implementations, control of the energy source comprises controlling the power level of the energy source by determining a minimum power required to for the proximity sensor to sense a proximate object under the sensed ambient light, and setting the power level of the energy source the determined minimum power.

The technology can take the forms of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, some implementations of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), DVD, and Blu Ray™. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, WiFi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A proximity sensor assembly comprising:
  a light source operative to emit light toward a first target area;
  a first proximity detector operative to detect light, including light emitted by the light source and reflected from the first target area; and
  a first light focusing device in a first optical path between the light source and the first proximity detector, the first optical path including an optical path from the light source and reflected from the first target area;
  the first light focusing device being within a scanning scope of the light source, such that the optical path between the light source and the first light focusing device is unimpeded, and a field of view of the first proximity detector.

2. The assembly of claim 1 wherein the first light focusing device is a microprism array.

3. The assembly of claim 2 wherein the microprism array is substantially in the first optical path between the light source and the first target area.

4. The assembly of claim 2 wherein the microprism array is substantially in the first optical path between the first target area and the first proximity detector.

5. The assembly of claim 2, wherein the first light focusing device is a diverging microprism array located substantially in the first optical path between the light source the first target area.

6. The assembly of claim 2, wherein the first light focusing device is a converging microprism array located substantially in the first optical path between the target area and the first proximity detector.

7. The assembly of claim 1 wherein the first light focusing device is a microlens array.

8. The assembly of claim 7 wherein the microlens array is substantially in the first optical path between the light source and the first target area.

9. The assembly of claim 7 wherein the microlens array is substantially in the first optical path between the first target area and the first detector.

10. The assembly of claim 1 further comprising a second light focusing device substantially in the first optical path between the light source and the first proximity detector.

11. The assembly of claim 10 wherein:
the first light focusing device is a diverging lens substantially in the first optical path between the light source the first target area; and
the second light focusing device is a converging lens substantially in the first optical path between the first target area and the first detector.

12. The assembly of claim 10 wherein:
the first light focusing device is a microprism array substantially in the first optical path between the light source the first target area; and
the second light focusing device is a microprism array substantially in the first optical path between the first target area and the first proximity detector.

13. An electronic device comprising:
a body defining an aperture;
a light source:
the light source positioned interior to the body, and
the light source operative to emit light toward a target area exterior to the body;
a proximity detector:
the proximity detector positioned interior to the body, and
the proximity detector operative to detect light, including light from the light source reflected from the target area;
a cover:
the cover positioned in the aperture, and
the cover positioned substantially in an optical path:
between the light source and the target area, and
between the target area and the proximity detector;
a light focusing device substantially in the optical path between the light source and the proximity detector, the optical path including the path of light from the light source reflected from the target area, and being within a scanning scope of the light source, such that the optical path between the light source and the first light focusing device is unimpeded, and a field of view of the first proximity detector.

14. The electronic device of claim 13 wherein the light focusing device is a diverging microprism array located substantially in the optical path between the light source and the target area.

15. The electronic device of claim 14 wherein the diverging lens is a plano-convex lens formed in the cover, comprising the convex surface on the interior surface of the cover.

16. The electronic device of claim 14 wherein the microprism array is formed on an interior surface of the cover.

17. The electronic device of claim 13 wherein the light focusing device is a converging microprism array located substantially in the optical path between the target area and the proximity detector.

18. The electronic device of claim 17 wherein the microprism array is formed on an interior surface of the cover.

* * * * *